United States Patent [19]
vom Baur, deceased et al.

[11] Patent Number: 5,192,411
[45] Date of Patent: Mar. 9, 1993

[54] ELECTRODE FOR ELECTROCHEMICAL REACTORS

[75] Inventors: Hans-Karl W. vom Baur, deceased, late of Frankfurt am Main, by Elke H. vom Baur née Spiller, Silke V. C. vom Baur, legal heirs; Steffen Dapperheld, Hofheim am Taunus; Klaus Kretschmann, Bischofsheim; Werner Lindner, Hofheim am Taunus; Rudolf Rossmeissl, Mertingen; Hans Milluwe, Eschborn; Gerhard Ullmann, Gross-Gerau, all of Fed. Rep. of Germany

[73] Assignee: Hoechst Aktiengesellschaft, Frankfurt am Main, Fed. Rep. of Germany

[21] Appl. No.: 638,839

[22] Filed: Jan. 8, 1991

[30] Foreign Application Priority Data

Jan. 10, 1990 [DE] Fed. Rep. of Germany ....... 4000505

[51] Int. Cl.$^5$ ............................................ C25B 11/02
[52] U.S. Cl. ..................................... 204/280; 204/294
[58] Field of Search ............... 204/280, 282, 283, 284, 204/294; 429/40

[56] References Cited

U.S. PATENT DOCUMENTS

| | | | |
|---|---|---|---|
| 3,871,922 | 3/1975 | Böhm | 136/120 FC |
| 4,217,401 | 8/1980 | Pellegri | 429/39 |
| 4,692,229 | 9/1987 | Bjäreklint et al. | 204/294 |
| 4,770,756 | 9/1988 | Cawlfield et al. | 204/284 |

FOREIGN PATENT DOCUMENTS

| | | |
|---|---|---|
| 1249232 | 9/1967 | Fed. Rep. of Germany . |
| 2487861 | 2/1982 | France . |
| 645674 | 10/1984 | Switzerland . |

*Primary Examiner*—John Niebling
*Assistant Examiner*—Kathryn Gorgos
*Attorney, Agent, or Firm*—Curtis, Morris & Safford

[57] ABSTRACT

In the electrode in the form of a rectangular parallelepiped composed of impregnated graphite material for electrochemical reactors, the electrode (4,5) is provided with openings (8,9,10,11) extending perpendicular to its active electrode surfaces (6,7) at its corners. Canals (12,13) which extend parallel to the active electrode surfaces (6,7) in the direction of an adjacent opening (9,10) originates in each case from two openings (8,10) situated diagonally opposite each other. The canals (12,13) have communicating channels (14,15) to the active electrode surfaces (6,7).

3 Claims, 1 Drawing Sheet

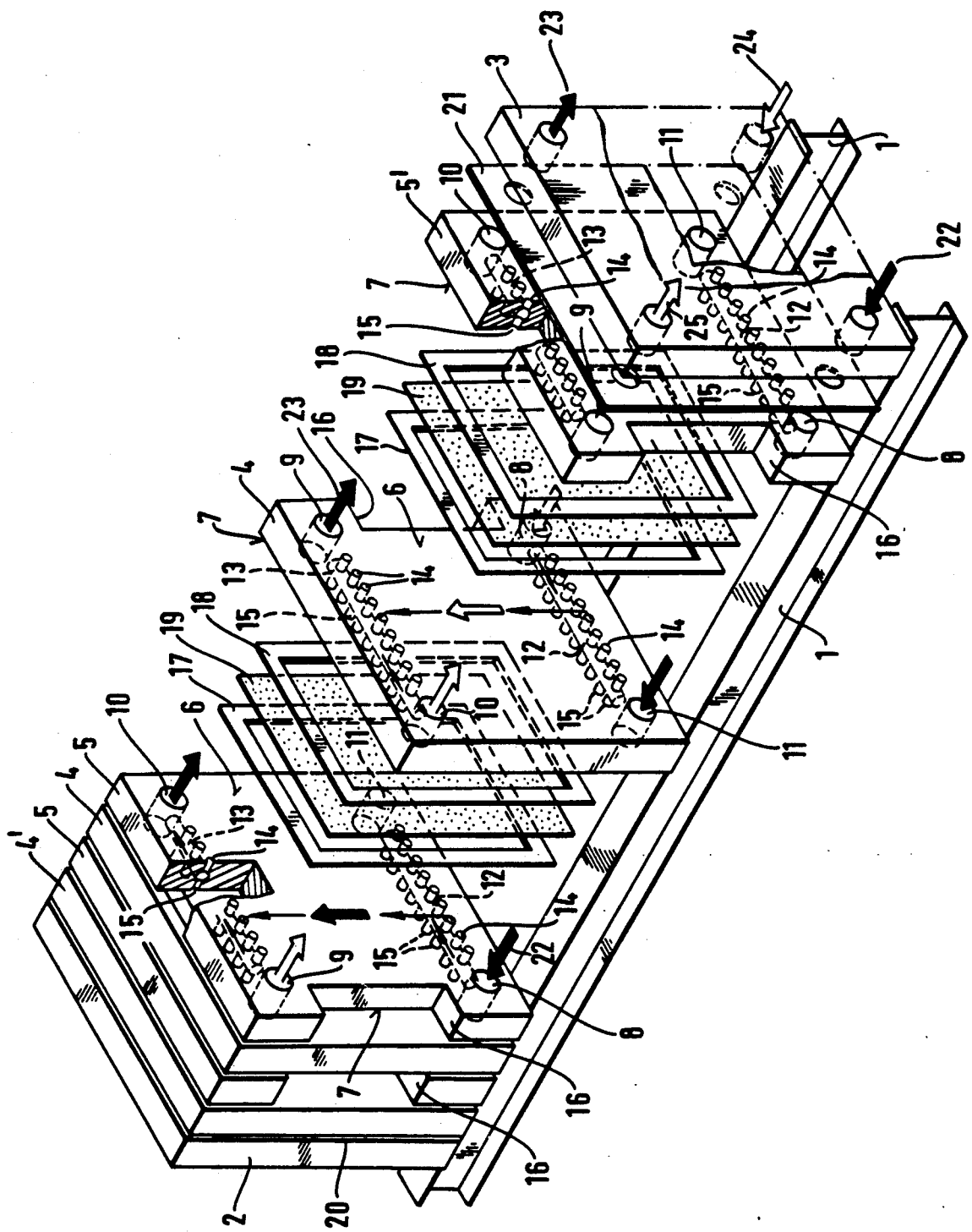

ELECTRODE FOR ELECTROCHEMICAL REACTORS

FIELD OF THE INVENTION

The invention relates to an electrode in the form of a rectangular parallelepiped, composed of impregnated graphite material, for electrochemical reactors constructed in filter press fashion for dehalogenating organic compounds.

BACKGROUND OF THE INVENTION

The dehalogenation of polybrominated or polychlorinated acetic acids, the selective electrochemical substitution of halogen in haloacrylic acids by hydrogen or deuterium, the preparation of fluorinated acrylic acids by electrochemical dehalogenation of chlorine-containing precursors or the electrochemical preparation of unsaturated halogenated hydrocarbons involves cathodic dehalogenation reactions in the presence of catalytic amounts of metallic salts such as, for example, lead acetate, copper nitrate and others. The reactions are carried out in partitioned electrolysis cells in the presence of water at current densities of up to 8000 $A/m^2$ under strongly acidic conditions. At the anode, aqueous or alcoholic hydrohalic acids are oxidized to elemental halogen. Hazardous substances having in some cases appreciable toxicity, such as halogenated acetic acids, fluorinated acrylic acid or fluorinated halogenated hydrocarbons can therefore be electrolyzed. The hydrogen bromide or hydrogen chloride eliminated in the electrolysis processes or the halogen formed anodically form aggressive electrolytes which act extremely corrosively towards metals. Examples of such electrolytes are mixtures of mono- and dichloroacetic acid and concentrated hydrochloric acid or chlorine and concentrated hydrochloric acid. The electrolytes have very good electrical conductivity. The processes are carried out at temperatures of up to 90° C. and in some cases under pressures of up to 10 bar. Graphite is preferably used as electrode material.

To carry out such dehalogenation processes on an industrial scale, partitioned flow-type electrolysis cells are preferably considered. Owing to their sealed construction, for example, flow-type electrolysis cells make it possible to electrolyze toxic, aggressive and otherwise hazardous substances. Furthermore, high electrolyte flow rates in the region of about 0.5–2 m/sec relative to the electrodes can be achieved in flow-type electrolysis cells. The most common design of a partitioned flow-type electrolysis cell is the plate-and-frame cell. It is composed essentially of usually rectangular electrode plates and frames made of plastic, for example polyethylene, polypropylene, polyvinyl chloride or polyvinylidene fluoride, which surround them. The electrode plate and the associated frame are frequently joined to each other to form an assembly unit. By pressing a plurality of such plate-and-frame units together, a stack which is assembled according to the constructional fashion of filter presses is obtained. Yet further frame units, for example for receiving spacing gauzes or turbulence generators, can be inserted in the stack. The membranes used to partition the cells into anode or cathode compartments are either inserted in a separate frame or clamped directly between the electrode frames. In the case of electrolysis in flow-type electrolysis cells constructed in filter press fashion, in which electrolytes having high electrical conductivity are used, electrical energy is usually supplied by a monopolar parallel connection of the electrodes, i.e. the electrical current is fed to every individual cathode or anode via a separate current supply leads. For this purpose, the anode plates and cathode plates are fed through between the frames on opposite sides of the cell in each case and are provided with current connections outside the cell.

Such plate-and-frame cells have the disadvantage, however, that the forces occurring on pressing the cell stack together have to be absorbed by the frames made of plastic materials which are not particularly dimensionally stable. Under continuous loading, in particular at elevated working temperatures and elevated working pressures, with higher pressure forces being necessary in turn to compensate for the latter, deformation (creep) of these materials can easily occur. In addition, the electrolytes encountered in organic electrosyntheses bring about, depending on the nature and concentration of the organic compounds contained therein, swelling or material embrittlement in the case of many of the conventional plastics, which results in distortion of the cell frames. In addition, appreciable changes in length, which can be compensated for only with difficulty by the conventional disk springs or helical springs of the pressure device occur as a consequence of the relatively high coefficients of thermal expansion (approximately a factor of 10 compared with graphite) of the plastics conventionally used for manufacturing the cell frames, in particular in the longitudinal direction of the cell stack. The above-mentioned properties of the plastics therefore frequently result in leaks in the cell stack, with high safety, health and environmental risks; they make expensive measures such as catching troughs and gas extraction devices necessary. A further disadvantage in the case of the known plate-and-frame cells is the more difficult reassembly and resealing of the cell stack after repair or after the routine replacement of electrodes or membranes if the cell frames have lost their dimensional accuracy as a result of the deformation, swelling or distortion described above.

OBJECT AND SUMMARY OF THE INVENTION

The problems described above for the known flow-type electrolysis apparatuses constructed in filter press fashion are solved by an electrode, wherein the electrode is provided with openings extending perpendicular to its active electrode surfaces at its corners, canals which extend parallel to the active electrode surfaces in the direction of an adjacent opening originates in each case from two openings situated diagonally opposite each other, and the holes have communicating channels to the active electrode surfaces.

One side of the electrode may be provided with a recess or a contact lug for the current supply.

The advantages achieved with the electrode according to the invention are essentially to be seen in the fact that, in the electrolysis apparatuses constructed therewith, the frames with all the sealing problems associated therewith are absent and an optimum distribution of the electrolytes in the individual electrolyte spaces is guaranteed. Sufficiently large cross sections are available for making electrical contact. A single electrode mold is sufficient for constructing the electrolyzer.

The invention is explained in greater detail below with reference to a drawing depicting only one means of embodiment.

BRIEF DESCRIPTION OF THE DRAWING

The figure shows an electrolysis apparatus constructed in filter press fashion and incorporating the electrode according to the invention.

DESCRIPTION OF A PREFERRED EMBODIMENT

The electrodes (4,5) are of plate-type construction, i.e. they have the shape of a rectangular parallelepiped whose largest faces function as active electrode surfaces (6,7). The electrodes (4,5) are provided with openings (8,9,10,11) perpendicular to the active electrode surfaces (6,7) at their corners. The openings (8,9,10,11) form the collection channels for the electrolytes in the assembled electrolysis apparatus. In order to avoid electrolysis in and/or a potential equalization via the electrolyte collection channels to adjacent electrodes, the latter have insulating linings (not shown). Canals (12,13) which extend parallel to the active electrode surfaces (6,7) in the direction of adjacent openings (9,11), without producing a connection to the latter, originates in each case from two openings (8, 10) situated diagonally opposite each other. The canals (12,13) have communicating channels (14,15) to the active electrode surfaces (6,7) via which the electrolytes are fed from the collecting channels via the canals (12,13) into the electrolyte spaces and vice versa. One side of the electrodes (4,5) may be provided with a recess (16). Instead of the recess, one side of the electrodes may also have a contact lug for receiving the current supply (not shown).

An electrolysis apparatus can be constructed as follows with the electrode according to the invention: opposite the electrode (4) is the counterelectrode (5), an electrode (4) rotated 180° around the perpendicular axis. Arranged between the electrodes (4,5) are seals (17, 18) between which a membrane (19) is clamped, with the result that two electrolyte chambers are produced. Such basic units comprising electrode (4), seal (17), membrane (19), seal (18) and counterelectrode (5) can be arranged in any desired number between an end plate (2) fixed on two carriers (1) and a movable end plate (3). The cell block so produced can be pressed together by means of a plurality of tie rods (not shown) or the like arranged uniformly around the cell block. The openings (8,9,10,11) are connected to form collecting channels by means of sealing rings (not shown) between the electrodes (4,5). An insulator (20,21) may be arranged between the end plates (2,3) and the respectively adjacent electrode (4,5). In the case of the terminal electrodes (4,5), the communicating channels (14,15) pointing in the direction of the end plates (2,3) may be sealed with suitable plugs. The electrolyte surfaces of the electrodes (4) are supplied with electrolyte via the collecting channel into which the arrow (22) (black) points and discharged via the collecting channel from which the arrow (23) (black) emerges. The electrode surfaces of the electrode (5) (counterelectrode) are supplied with electrolyte via the collecting channel into which the arrow (24) points and drained via the collecting channel from which the arrow (25) emerges. The arrows (22, 23, 24 and 25) indicate in each case the flow direction of the electrolytes into the collecting channels and the electrolyte spaces. Except for the two end electrodes (4' and 5'), all the electrodes function on both sides and the electrolyte has to be fed accordingly. As a result of the recesses (16), the adjacent electrodes become accessible for a particularly advantageous attachment of the current supply leads.

What is claimed is:

1. An electrode in the form of a rectangular parallelpiped composed of impregnated graphite material for electrochemical reactors, wherein the electrode is provided with openings extending perpendicular to its active electrode surfaces at its corners thereby defining collection channels for electrolyte, canals which extend parallel to the active electrode surfaces in the direction of adjacent openings across the electrode originating from said perpendicular openings situated diagonally opposite each other, and the canals feeding electrolyte into communicating channels which feed electrolyte directly to the active electrode surfaces.

2. The electrode as claimed in claim 1, wherein one side of the electrode is provided with a recess.

3. The electrode as claimed in claim 1, wherein one side of the electrode is provided with a contact lug for the current supply lead.

* * * * *